United States Patent [19]

Behr

[11] Patent Number: 4,898,497

[45] Date of Patent: Feb. 6, 1990

[54] METHOD FOR CEMENTITIOUS COATING OF PIPE AND FORMS FOR USE THEREWITH

[76] Inventor: Keith R. Behr, 8201 W. Montebello, Glendale, Ariz. 85303

[21] Appl. No.: 149,524

[22] Filed: Jan. 28, 1988

[51] Int. Cl.4 .............................. F16L 1/02; F16L 9/04
[52] U.S. Cl. ..................................... 405/154; 138/97; 405/155
[58] Field of Search ............... 405/154, 155, 157, 156; 138/97, 105; 427/352, 372.2, 397.7

[56] References Cited

U.S. PATENT DOCUMENTS

| | | | |
|---|---|---|---|
| 4,298,296 | 11/1981 | Hanson | 405/155 X |
| 4,335,752 | 6/1982 | Sumner | 405/154 X |
| 4,345,854 | 8/1982 | Valantin | 405/155 X |

FOREIGN PATENT DOCUMENTS

| | | | |
|---|---|---|---|
| 220981 | 4/1985 | German Democratic Rep. | 405/155 |
| 225737 | 8/1985 | German Democratic Rep. | 405/155 |

Primary Examiner—David H. Corbin
Attorney, Agent, or Firm—Cahill, Sutton & Thomas

[57] ABSTRACT

Metal pipe sections are welded together at the job site and then progressively coated with concrete by a traveling coating machine moving along the length of the pipe. After the coating operation the pipe is supported on forms having an upper concave portion shaped to receive the curved pipe. After the coating has hardened the pipe can be removed from the forms and installed. Apertures in the forms allow fluid to drain from the coating. Curved shims containing apertures aligned with those in the forms may be used to accommodate smaller pipe diameters.

10 Claims, 2 Drawing Sheets

U.S. Patent  Feb. 6, 1990  Sheet 2 of 2  4,898,497
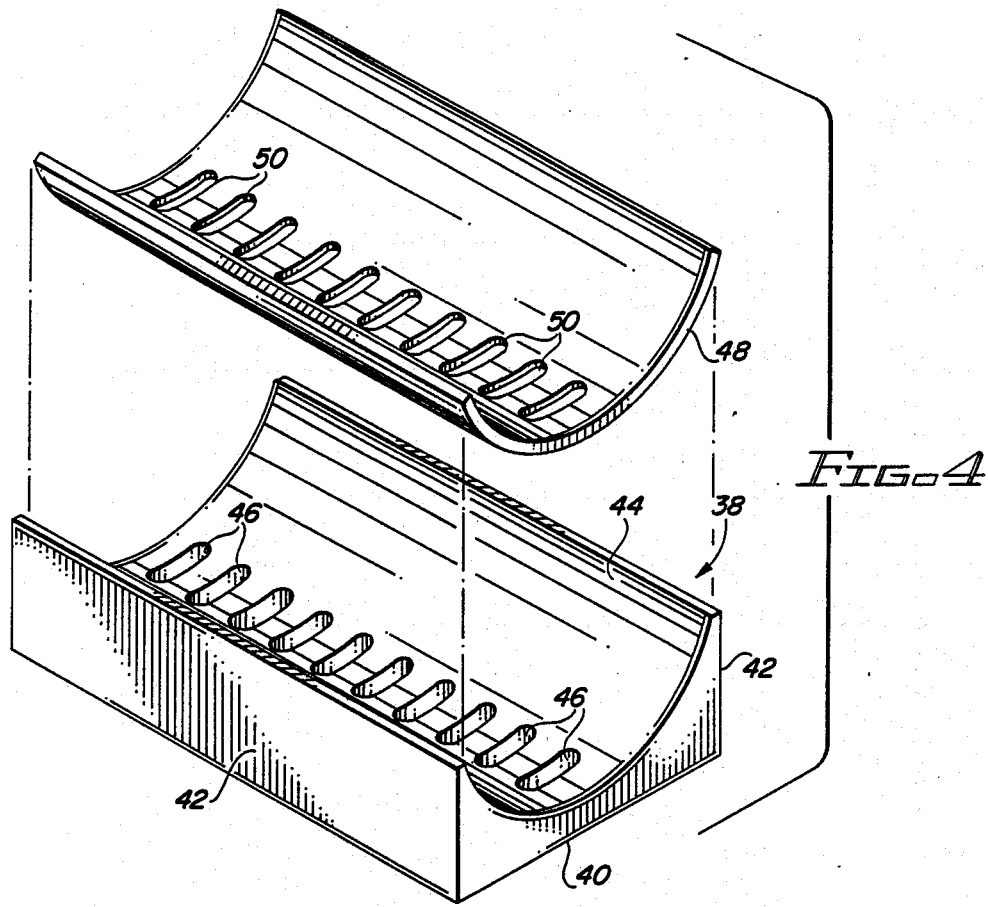
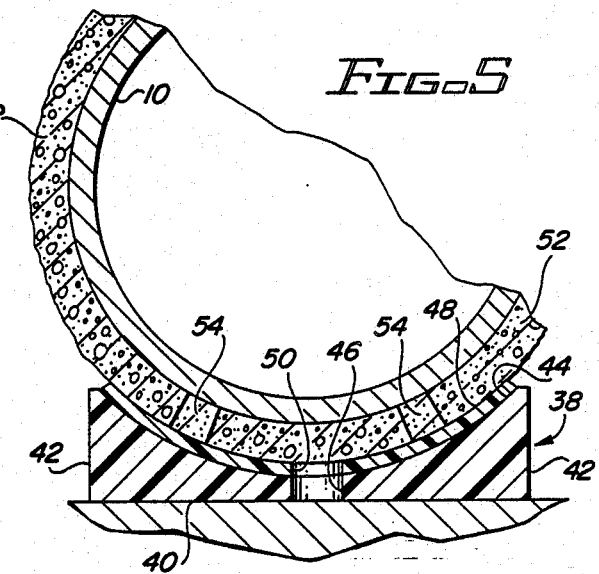
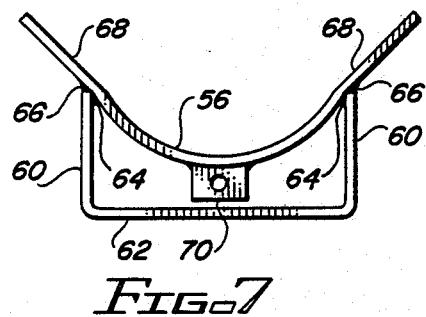
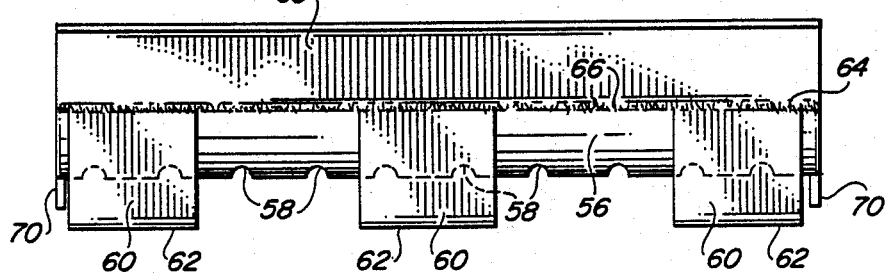

METHOD FOR CEMENTITIOUS COATING OF PIPE AND FORMS FOR USE THEREWITH

BACKGROUND OF THE INVENTION

1. Field of the Invention

This invention relates broadly to the coating of pipe, and more particularly to a method and means for coating pipe with cementitious material.

2. Description of the Prior Art

Pipes are often coated before being installed in order to provide certain qualities not possessed by the uncoated pipe. This is particularly true in the case of metal pipes, which are normally coated with asphalt or plastic material to protect against corrosion and are also sometimes coated with granular material to provide shock resistance. In addition, if the pipes are to be used in a wet environment, such as in river crossings and offshore oil wells, or even in moist environments such as marshy grounds, they are normally coated with concrete to weight them down so as to protect against buoyancy or upward movement of the installed pipes.

When coating metal pipe with concrete, individual sections of pipe are normally coated by hand or by a sprayed fluid concrete mixture. In either case, the end portions of the pipe are left uncoated and are placed on end support stands to support the pipe section while the concrete is curing. After the coating is cured, the coated pipe sections are strung together on the pipe right-of-way and the pipe ends are welded together to form a continuous length of pipe. The uncoated end portions of the pipe sections are then also coated with concrete and, after curing, the pipe length is ready to be installed.

This procedure requires a great deal of time and can substantially delay the laying of the pipe line. Even if the application of concrete to the pipe lengths is carried out at the job site instead of at a plant or yard site, the double application of concrete to the pipe still extends the duration of the coating process. The coating procedure could obviously be shortened by coating the pipe in a single operation, but the prior art has not heretofore provided a way of accomplishing this. Although coating machines have been developed for applying asphalt and epoxy corrosion resistant materials to continuous lengths of pipe, the same concept has not been used to apply cementitious coatings to continuous lengths of metal pipe, presumably because of the unique problems involved in applying thick layers of cementitious material and the difficulty in supporting the coated pipe during the relatively long curing process without damaging the coating.

The choices offered, therefore, are to either coat the pipe sections individually in the slow conventional manner in order to allow the coating to cure prior to connecting the pipe in the field, or to coat the pipe after connecting the sections together, but only at the great risk, if not the certainty, of damaging the concrete coating while supporting the pipe as it is curing.

It would obviously be advantageous to be able to substantially shorten the cementitious coating process without adversely affecting the quality of the coated pipe for the reasons discussed above.

SUMMARY OF THE INVENTION

This invention involves a method for coating pipe with a layer of cementitious material by connecting a plurality of pipe sections together to form a length of pipe, progressively coating the length of pipe with the cementitious material, supporting the coated pipe on support forms and curing the cementitious coating material while the pipe is supported on the forms.

In a preferred embodiment the support forms comprise concave support surfaces on which the pipe rests. The curvature of the concave surface substantially matches the curvature of the outer surface of the coating so that the support forms uniformly contact the coating and hold the pipe securely to help the coating maintain uniform shape and thickness as it cures. Shims can be used in the concave portion of the form to accommodate coated pipe of lesser diameter, and both the main portion of the forms and the shims may be provided with apertures to allow fluid to drain from the cementitious material as it cures. The details of the design of the form may vary depending on the material used to fabricate the form and the size and weight of the coated pipe.

The actual coating operation preferably is performed by a coating machine that travels along the length of the pipe after the sections of pipe have been welded together. As the machine moves along the pipe, the portions that have just been coated are lowered to the support forms described above so that the fresh coating can retain its cylindrical shape during curing. This operation does not interfere with the usual pipe laying practices and permits the pipe to be laid in the trench or other final installation location as soon as the coating has sufficiently cured.

Accordingly, it is an object of the present invention to provide a method of coating a pipe which will enable cementitious coatings to be applied to the entire length of a pipe rather than having to leave the end portions uncoated to allow the pipe sections to be later welded together.

Another object of the invention is to provide a method of applying a cementitious coating to a length of pipe comprised of pipe sections which have been connected together, and supporting the coated pipe so that the coating is not damaged but retains its intended shape and dimensions.

A further object of the invention is to provide a support form for receiving and supporting the freshly coated pipe which allows for drainage of fluid from the coating and securely holds the pipe in place during the curing process.

These and other objects of the invention, as well as other features and benefits thereof, may be ascertained and more fully understood from the following description when read in conjunction with the accompanying drawings.

BRIEF DESCRIPTION OF THE DRAWINGS

FIG. 4 is a perspective view of one embodiment of the support form of the present invention and a shim for use in cooperation therewith;

FIG. 5 is a partial transverse sectional view of a coated pipe supported on the support form of FIG. 4;

FIG. 6 is a side elevation of a modified support form of the present invention; and FIG. 7 is an end view of the support form of FIG. 6.

DESCRIPTION OF THE PREFERRED EMBODIMENT

Figure 1:
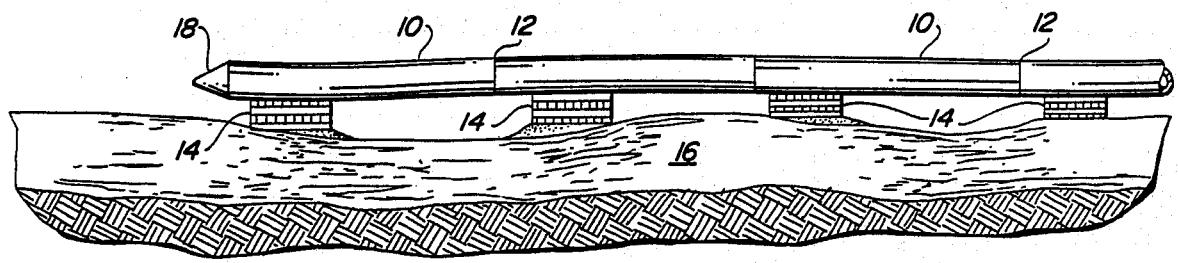
FIG. 1 is a longitudinal sectional view taken through the ditch or trench in which a pipe line is to be laid, with connected sections of pipe being shown on supports adjacent the trench.

Referring to FIG. 1 of the drawing, sections of metal pipe 10 which have been welded together at their ends to form welded connections 12 are shown resting on supports 14. The supports 14 will have been distributed along the right-of-way of the pipe line at intervals appropriate to the size and weight of the pipe to be supported, and in this case are shown adjacent the trench or ditch 16 in which the pipe eventually will be laid. They may be comprised of any suitable and convenient materials, such as, for example, brick, sand, wood or even mounds of earth from the job site. The pipe sections will have been positioned in end-to-end relationship along the right-of-way and will have been bent by a conventional pipe bending machine to contour the pipe to the designed alignment. The welding operation will then have been carried out in any conventional manner, typically using a line-up clamp to align the adjacent ends of the pipe sections to provide the proper gap and spacing for the weld to be made. As the welding of adjacent pipe sections is completed, the supports 14 are placed under the pipe to support it as needed, resulting in the arrangement shown in FIG. 1.

Figure 2:
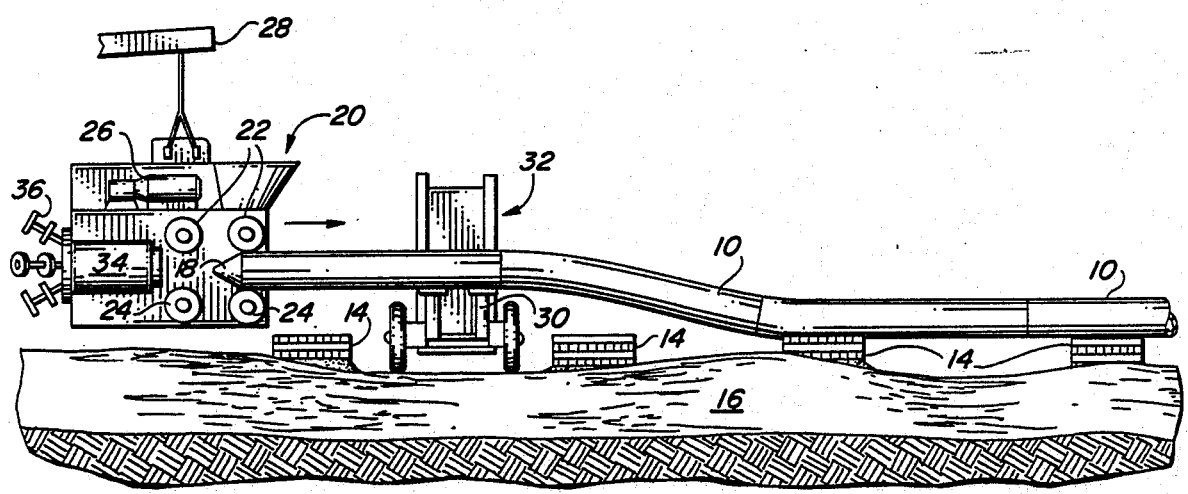
FIG. 2 is a longitudinal view similar to that of FIG. 1, but also showing a coating machine as it begins its travel along the length of pipe.

As shown in both FIGS. 1 and 2, a conical bull plug 18 has been attached to the leading end of the leading pipe section 10 by any convenient means, such as by welding or clamping. This facilitates entry of the pipe into a traveling coating machine 20 which includes drive wheels 22 above the pipe 10 and support wheels 24 beneath the pipe. The drive wheels 22 are driven through a suitable engine and power take-off arrangement 26, the connection of which to the drive wheels is not shown since the details thereof do not form part of the invention. The selection of a suitable engine and power take-off arrangement as well as the connection to the drive wheels is well within the knowledge of one skilled in the mechanical arts.

To start the coating machine on the pipe, the drive wheels 22 will be rotating in a clockwise direction as viewed in the drawing, and the coating machine 20 will be held by a boom 28 at a height to enable the bull plug 18 to enter the machine between the leading drive wheel 22 and leading support wheel 24. The pipe 10 will have been raised to the proper elevation by a suitable lifting device 30 carried on a self-propelled cart or vehicle 32. Engagement of the leading drive wheel 22 first with the bull plug and then with the pipe will cause the coating machine 20 to begin to travel along the pipe as if the pipe were a track. Continued movement of the machine will result in the pipe engaging the trailing drive wheel 22 and trailing support wheel 24 and entering the coating chamber or mold box 34.

A suitable cementitious material, such as concrete, would be fed continuously into the coating chamber by a hopper, not shown, which would move with the coating machine along the length of the pipe. The cementitious material would be charged to the chamber in the space between the pipe and the interior surfaces of the chamber and would be subjected to vibration and packing elements to compact the material. As the pipe exits from the chamber, the force of the incoming cementitious material causes the material to exit with the pipe through a suitably shaped opening concentric with the pipe to in effect extrude the coating onto the pipe. If desired, power spools 36 can wrap wire mesh around the coated pipe for purposes of reinforcement. A plastic wrap may also be introduced from power spools to aid in adhering the concrete to the pipe before it is deposited on the forms, to help maintain the thickness of the coating and to promote the curing of the concrete.

Figure 3:
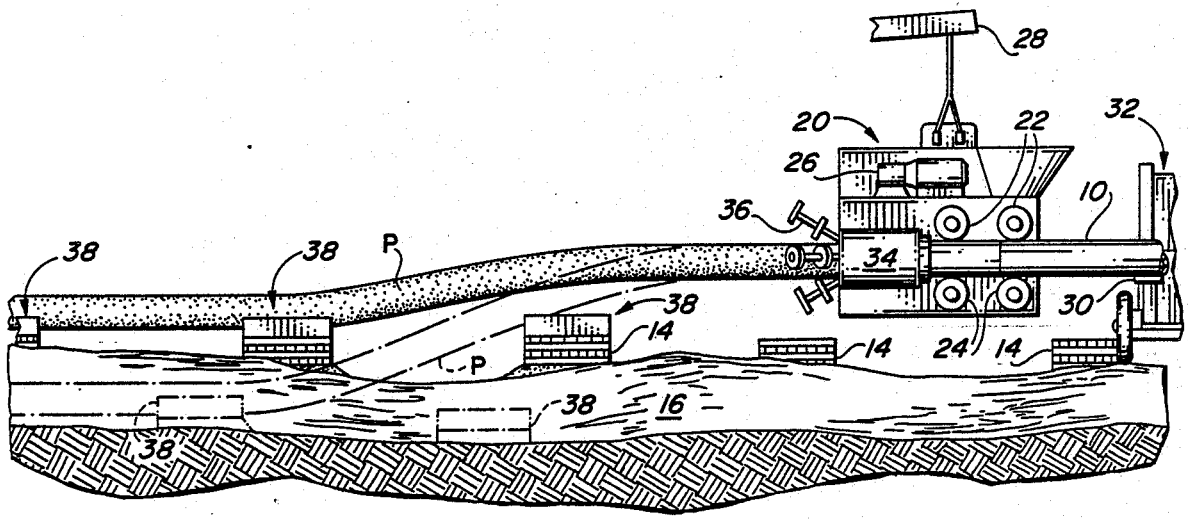
FIG. 3 is a longitudinal sectional view similar to that of FIG. 2, but showing the coating machine at a downstream location and the coated pipe being supported by the support forms of the present invention.

As shown in FIG. 3, as the coating operation continues the lifting mechanism 32 and the coating machine 20 move along the length of the pipe toward the right of the drawing, the coating machine coating the pipe as it travels. Note that support forms 38 have been set in place on the supports 14 after the coating machine has moved past the supports 14. It is necessary in accordance with the invention to use the forms 38 to support the freshly coated pipe in order to properly support the green coating and the weight of the coated pipe P during the curing process. Although the support forms 38 are illustrated as resting on the supports 14, it is not essential that the support forms be placed in this manner. For example, as shown in dotted lines, they could be placed directly in the trench 16 if desired, and the coated pipe P deposited directly thereto from the coating machine.

Referring now to FIG. 4, the form 38 comprises a bottom surface 40 connected by side walls 42 to a concave support surface 44. Although shown as flat, the bottom surface 40 may be of any shape determined to be best suited for the terrain or for being positioned on top of the supports 14 referred to in connection with FIGS. 1–3. The form is of solid construction and typically would be comprised of a suitable plastic material having enough strength to support the weight of a portion of the coated pipe. A number of apertures 46 are provided in the form, extending from the support surface 44 through the bottom surface 40 to allow drainage of fluid from the coating or of any other substance that might otherwise accumulate on the concave surface 44.

The concave surface 44 is designed to have the same radius of curvature as the radius of curvature of the pipe coating. The extent to which the curved support surface 44 extends upwardly will vary according to such considerations as the diameter of the coated pipe and the thickness and type of coating, but in general the support form 38 will be designed to support the weight of the coated pipe and to support the green coating material so it can hold its shape and thickness during the curing period. Forms designed for a relatively large diameter coated pipe can also be used for smaller diameter coated pipes by employing a curved shim 48, the convex surface of which conforms to the curvature of the support surface 44 of the form 38 and the concave surface of which conforms to the curvature of the smaller diameter coated pipe. The shim 48 would also be provided with apertures aligned with the apertures 46 in the form 38. The use of shims reduces the expense of the support forms since the shims are less costly than another set of smaller forms would be.

The form 38, with the shim 48 in place, is shown in FIG. 5 with a portion of a coated pipe P supported thereon. As can be seen, the concrete coating 52 of the coated pipe is supported on the shim 48, but would of course be supported directly on the support form 38 if the shim were not used. It can be seen that the aligned apertures 46 and 50, being located at the bottom of the concave support surface of the form, provides for drainage of fluid or other substances which may otherwise accumulate during the curing process. The bottom surface 40 of the support form is shown to be flat in order to be adequately supported by the flat support surface. As mentioned above, if the support surface on which the form 38 rests were of a different shape, the bottom surface of the form could be designed accordingly.

If desired, additional support blocks, such as bricks of suitable size, may be placed at intervals on the concave support surface of the support forms when setting the forms in place so that when a portion of freshly coated pipe is deposited thereon the brick will penetrate the coating and provide a support surface against which the pipe 10 can directly rest. This arrangement is shown in FIG. 5 wherein blocks 54 have been incorporated into the pipe coating by the method just described. This would not be done, of course, if plastic wrap has been applied to the coating as the coated pipe exits from the coating machine.

A modified support form comprised of metal is shown in FIGS. 6 and 7 as comprising a concave support section 56 containing apertures 58. Spaced along the length of the support section 56 are support bases comprising upright side walls 60 integrally formed with a flat bottom support wall 62. The side walls 60 may be attached to the concave support section 56 by any suitable means but are illustrated as being welded to the upper side edges of the support section at 64. Also welded to the upper side edges of the support section at 66 are angled plates or lips 68 which extend out from the concave support section at an angle to facilitate entry of the coated pipe into the support form. Lugs 70 may be provided at the ends of the support forms to enable the forms to be joined together as by bolting or other means to provide more uniform support, prevent shifting of individual supports, maintain the elevation of adjacent concave support surfaces constant and speed up the process of collecting the support forms after the pipe is laid.

The curing process of the pipe coating may be carried out according to conventional practice. The coating may have to be periodically moistened if weather conditions require it or suitable additives may have to be included in the coating mix to accommodate high or low temperatures. The use of support forms during the curing process, however, does not require any change from normal curing procedures.

It will now be appreciated that the present invention provides a simple yet highly effective means for applying and curing a cementitious coating to a length of pipe. The ability to coat the joined sections in the field as opposed to first having to coat individual pipe sections up to their end portions and then having to coat the end portions themselves in a separate process yields a considerable savings in time and labor. The use of a coating machine to continuously apply the coating greatly speeds up the coating process. Further, the use of the support forms of the present invention to receive the freshly coated pipe directly from the coating machine and to hold the coated pipe in place for the duration of the curing process maintains the coated pipe in stable condition and allows the coating material to drain.

While the principles of the invention have now been made clear in the illustrated embodiments and in the foregoing description, it will be obvious to those skilled in the art that modifications of structure, arrangements, proportions, elements, materials and components used in the practice of the invention which are particularly adapted for specific environments and operational requirements may be made without departing from those principles. The appended claims are therefore intended to cover and embrace any such modifications within the limits only of the true spirit and scope of the invention.

What I claim is:

1. A method of coating pipe with a layer of cementitious material at a job site, comprising the steps of:
   (a) providing a plurality of pipe sections;
   (b) connecting the pipe sections at the job site to form a length of pipe;
   (c) progressively coating the length of pipe with the cementitious material;
   (d) supporting the uncured coating of cementitious material about the length of pipe on support forms having a concave support surface; and
   (e) curing the cementitious material.

2. A method of coating pipe according to claim 1, including the additional steps of:
   (a) removing the support forms after the cementitious material is cured; and
   (b) laying the pipe in its permanent position.

3. A method of coating pipe according to claim 1, wherein the coated pipe is supported on the support forms by placing the portions of the pipe which have been coated with cementitious material on the support forms while exercising said step of coating on the remaining uncoated portions of pipe.

4. A method of coating pipe according to claim 1, wherein the curvature of the concave support surface substantially corresponds to the curvature of the coating of cementitious material.

5. A method of coating pipe according to claim 4, including the step of draining moisture from the cementitious coating through the support forms during the curing of the cementitious material.

6. A method of coating an elongated length of metal pipe with cementitious material at a job site, comprising the steps of:
   (a) providing a plurality of metal pipe sections;
   (b) permanently connecting the ends of the metal pipe sections together to form an elongated length of metal pipe;
   (c) supporting the elongated length of metal pipe;
   (d) progressively lifting a portion of the metal pipe and coating the lifted portion with cementitious material;
   (e) supporting the uncured coated portion of the metal pipe on support forms having a concave pipe support surface; and
   (f) curing the cementitious material.

7. A method of coating an elongated length of metal pipe according to claim 6, wherein said steps of lifting and coating are carried out by a self-propelled coating machine traveling along the length of the metal pipe.

8. A method of coating an elongated length of metal pipe according to claim 6, wherein the curvature of the concave pipe support surface substantially corresponds to the curvature of the outer circumference of the coating of cementitious material about the coated pipe.

9. A method of coating an elongated length of metal pipe according to claim 8, wherein the concave pipe support surface contains apertures therein and including the step of draining fluid from the cementitious material through the support surface.

10. A method of coating an elongated length of metal pipe according to claim 9, including the step of removing the support forms from beneath the length of pipe after the cementitious material has cured to a desired degree of hardness and laying the length of pipe in its final installed position.

* * * * *